United States Patent [19]

Imanishi

[11] Patent Number: 4,590,572
[45] Date of Patent: May 20, 1986

[54] SYSTEM FOR MODIFYING A SYNCHRONIZED CONTROL PROGRAM FOR PLURAL TOOL BASES BY ADDING STANDBY DATA

[75] Inventor: Kazuo Imanishi, Aichi, Japan

[73] Assignee: Mitsubishi Denki Kabushiki Kaisha, Tokyo, Japan

[21] Appl. No.: 613,475

[22] Filed: May 23, 1984

[30] Foreign Application Priority Data

May 23, 1983 [JP] Japan .................................. 58-90276

[51] Int. Cl.$^4$ .............................................. G05B 7/00
[52] U.S. Cl. .................................... 364/474; 364/192
[58] Field of Search ............... 364/475, 474, 513, 191, 364/192; 901/6, 7, 8

[56] References Cited

U.S. PATENT DOCUMENTS 4,497,028  1/1985  Nozawa et al. ..................... 364/474

Primary Examiner—Jerry Smith
Assistant Examiner—Allen MacDonald
Attorney, Agent, or Firm—Sughrue, Mion, Zinn Macpeak & Seas

[57] ABSTRACT

A numerical control system applies standby commands, through external pushbutton switches or the like, to tool bases which operate on a first trial basis or by way of graphics machining simulation and are required to wait in a standby mode, stores standby data by removing the standby commands, and effects standby control on the tool bases based on the stored standby data during actual machining operations.

4 Claims, 13 Drawing Figures

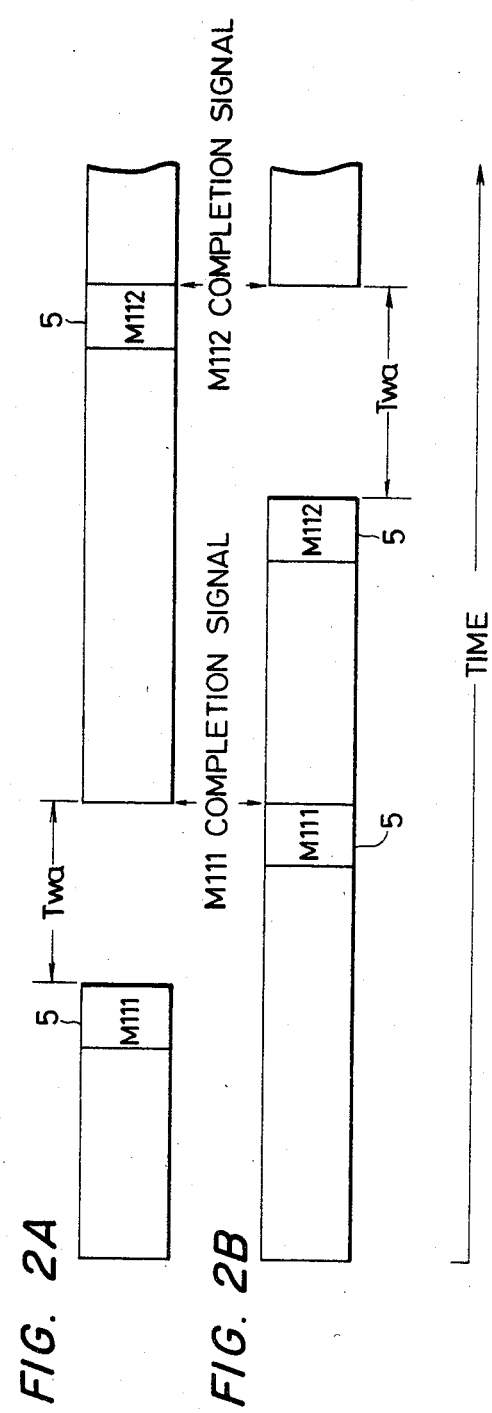
FIG. 2A
FIG. 2B
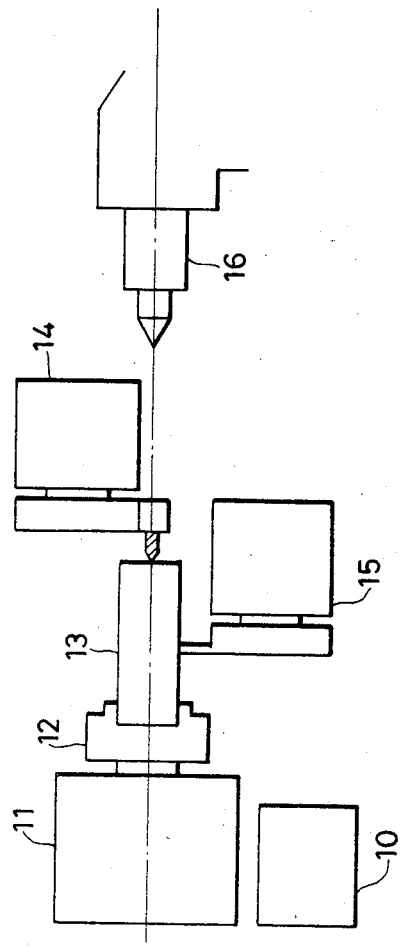
FIG. 3

SYSTEM FOR MODIFYING A SYNCHRONIZED CONTROL PROGRAM FOR PLURAL TOOL BASES BY ADDING STANDBY DATA

BACKGROUND OF THE INVENTION

The present invention relates to an NC (Numerical Control) system, and more particularly to standby control in such a numerical control system for a multi-axis tool base, for instance, as employed for four-axis lathe machining.

For standby control in an NC of the type described it has been required to specify a standby code (an M code) in a machining program. It is difficult to know the standby timing for the tool base at the time of preparing the program. It has therefore been necessary to run the machining program once to extract positions which require standby operation of the tool base. Each time such a position is extracted, the machining program has had to be edited again to insert a standby code (an M code). Where standby codes (M codes) are inserted appropriately in the machining program upon preparation thereof, the time required for the machining operation contains unnecessary intervals. Re-editing the machining program for standby operation of the tool base has required a skilled operator and has resulted in a large expenditure of time.

SUMMARY OF THE INVENTION

It is an object of the present invention to provide a numerical control system which gives standby commands, through external pushbutton switches or the like, to tool bases which are operated first on a trial basis or by way of graphics simulation and required to wait in a standby mode, stores standby data by removing the standby commands, and effects standby control on the tool bases based on the stored standby data during an actual machining operation so that the tool bases can easily be brought into the standby mode without having no edit machining programs as with conventional systems.

According to the present invention, there is provided a numerical control unit for a lathe having a plurality of tool bases, comprising means for entering standby commands for temporarily stopping the tool bases while the tool bases are being simultaneously operated under respective machining programs, a standby data setting unit for storing the program number and the block number of the machining program for one of the tool bases stopped in movement by the standby command and for releasing the one of the tool bases as stopped when the standby command is removed and storing as standby data the program number and the block number of the machining program for another tool base at the time, a standby data file or successively storing standby data set by the standby data setting unit a plurality of times during an operation, and a standby control unit for referring to standby data in the standby data file from a previous operation, detecting a standby block from the machining programs being executed for the tool bases, issuing a standby command to temporarily stop one of the tool bases, and detecting a standby release block from the machining program being executed for another tool base to remove the standby command.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIGS. 1A and 1B are diagrams showing machining programs for effecting standby commands in a conventional NC system;

FIGS. 2A and 2B are sequence diagrams of standby operations in the conventional NC system;

FIG. 3 is a schematic side elevational view of a four-axis lathe;

DESCRIPTION OF THE PREFERRED EMBODIMENTS

Figure 4:
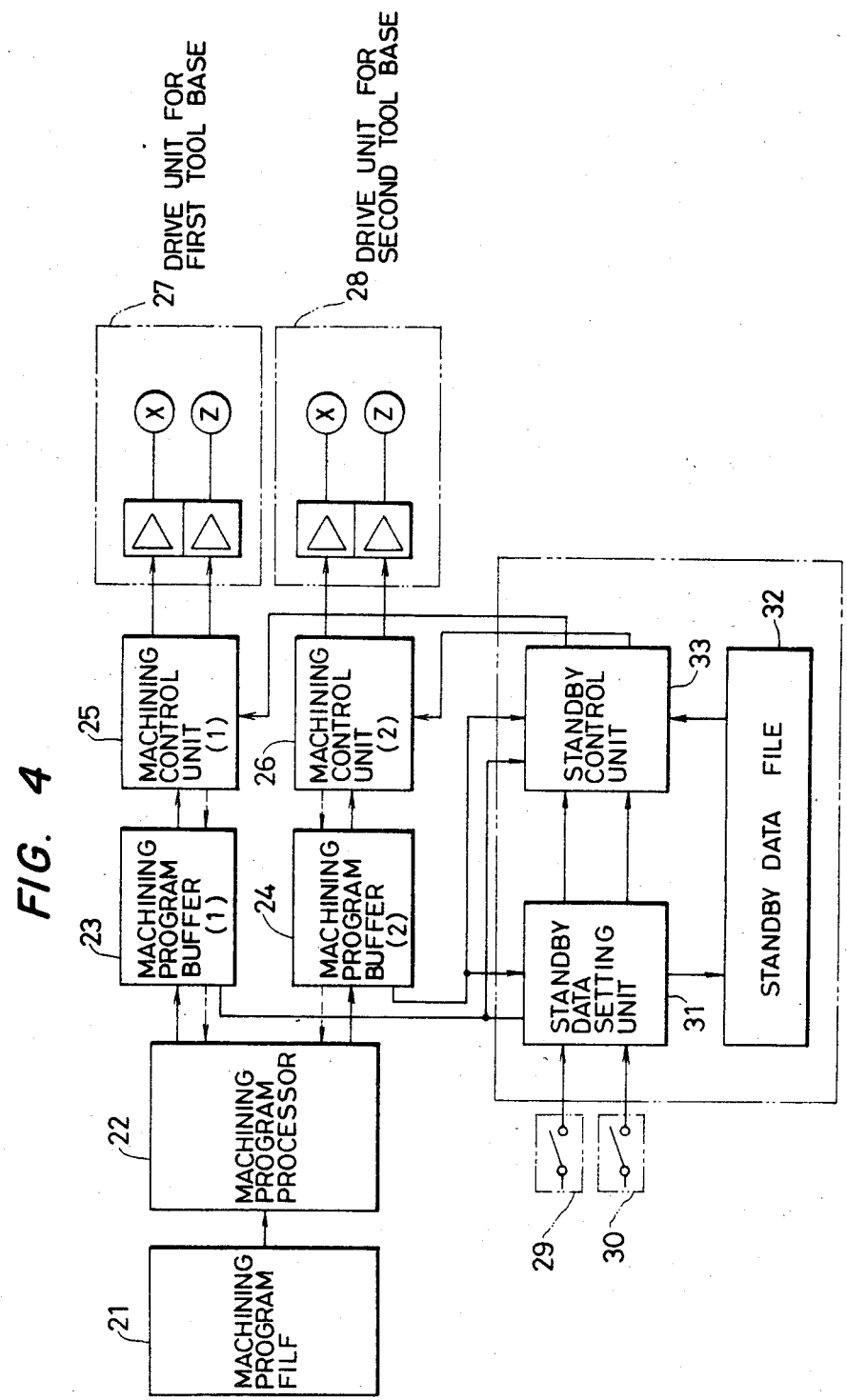
FIG. 4 is a block diagram of an NC system according to the present invention.

Heretofore, standby control has been carried out by specifying standby codes (M commands) in a machining program. FIGS. 1A and 1B illustrate such conventional machining programs by way of example. FIG. 1A shows a machining program for one tool base, and FIG. 1B shows a machining program for another tool base. M commands "M111", "M112" for standby operation of the tool bases are shown enclosed by dotted lines 1 through 4.

FIGS. 2A and 2B are illustrative of sequence operations of the two tool bases.

Execution of the machining programs will be described.

When the machining programs shown in FIGS. 1A and 1B are loaded into an NC system and the NC system is started, the machining programs simultaneously start to be run for enabling tools to machine a workpiece. Upon execution of the M command 1 "M111" in the program of FIG. 1A, the specified first tool base is brought into a mode waiting for an "M111" completion signal and hence is interrupted in its operation. During this time, the other tool base continues to machine the workpiece according to the machining program of FIG. 1B. When the M command 2 "M111" is executed, the same M command is issued to both of the tool bases. Since the "M111" completion signals are simultaneously given, both tool bases start or continue machining the workpiece according to a next subsequent command. As described above, the first tool base remains in a standby mode after the M command 1 "M111" has been executed and before the machining program (FIG. 1B) for the other tool base executes the M command 2 "M111". Likewise, the other tool base is brought to a standby mode by the M command 3 "M112" in the machining program of FIG. 1B, and remains in the standby mode until the machining program (FIG. 1A) for the first tool base executes the M command 4 "M112".

As shown by the operation sequences in FIGS. 2A and 2B, the machining programs for the respective tool bases, when executing M commands t, put the tool bases in a standby mode for an interval Twa until M commands of the same codes are executed in the machining programs for the other tool bases. By issuing a completion signal by ANDing the M commands for the two tool bases, standby control can be performed at positions where M codes are inserted. However, the conventional NC system has suffered the drawbacks as described before since M codes for standby operation need to be specified in machining programs.

The present invention will hereinafter be described. FIG. 3 shows an arrangement of a four-axis lathe which is connected to an NC system 10 according to the present invention. The four-axis lathe includes a spindle base 11, a chuck 12 for holding a workpiece 13, a first tool base 14, a second tool base 15, and a headstock spindle 16.

FIG. 4 illustrates in block form the NC system according to the present invention. The NC system includes a machining program file 21, a machining program processor 22 for analyzing machining programs and generating machining commands for the respective tool bases 14 and 15, machining program buffers 23 and 24, machine control units 25 and 26 for the respective tool bases 14 and 15, a drive unit 27 for the first tool base 14, a drive unit 28 for the second tool base 15, a standby command switch 29 for the first tool base 14, and a standby command switch 30 for the second tool base 15, the standby command switches 29 and 30 being installed on a control panel or the like. The NC system also includes a standby data setting unit 31 for setting and storing standby data in response to a standby command input, a standby data file 32 for sucessively storing standby data, and a standby control unit 33 for detecting and controlling standby blocks based on the standby data.

Figure 5:
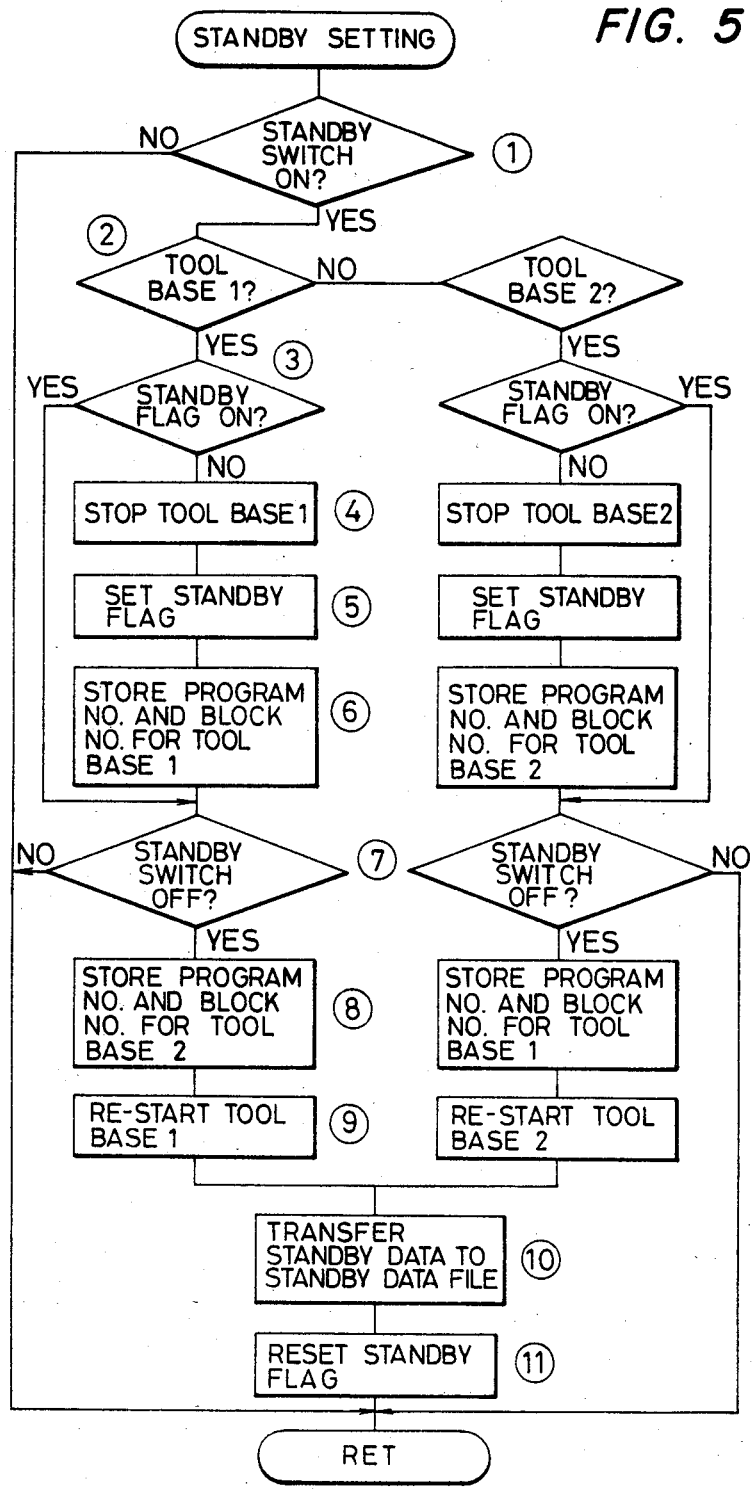
FIG. 5 is a flowchart of operations of a standby data setting unit in the NC system shown in FIG. 4.
Figure 6:
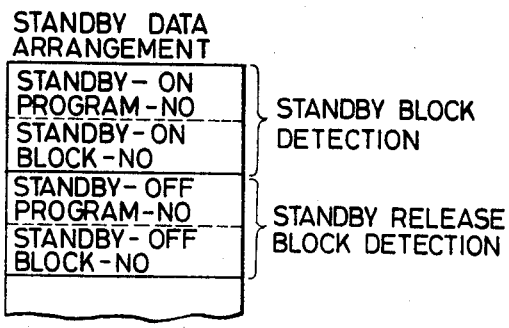
FIG. 6 is a diagram showing the arrangement of standby data.

FIG. 5 is a flowchart of a processing operation of the standby data setting unit 31, the processing operation having successive steps 1 through 11. FIG. 6 is illustrative of stored standby data.

Figure 7:
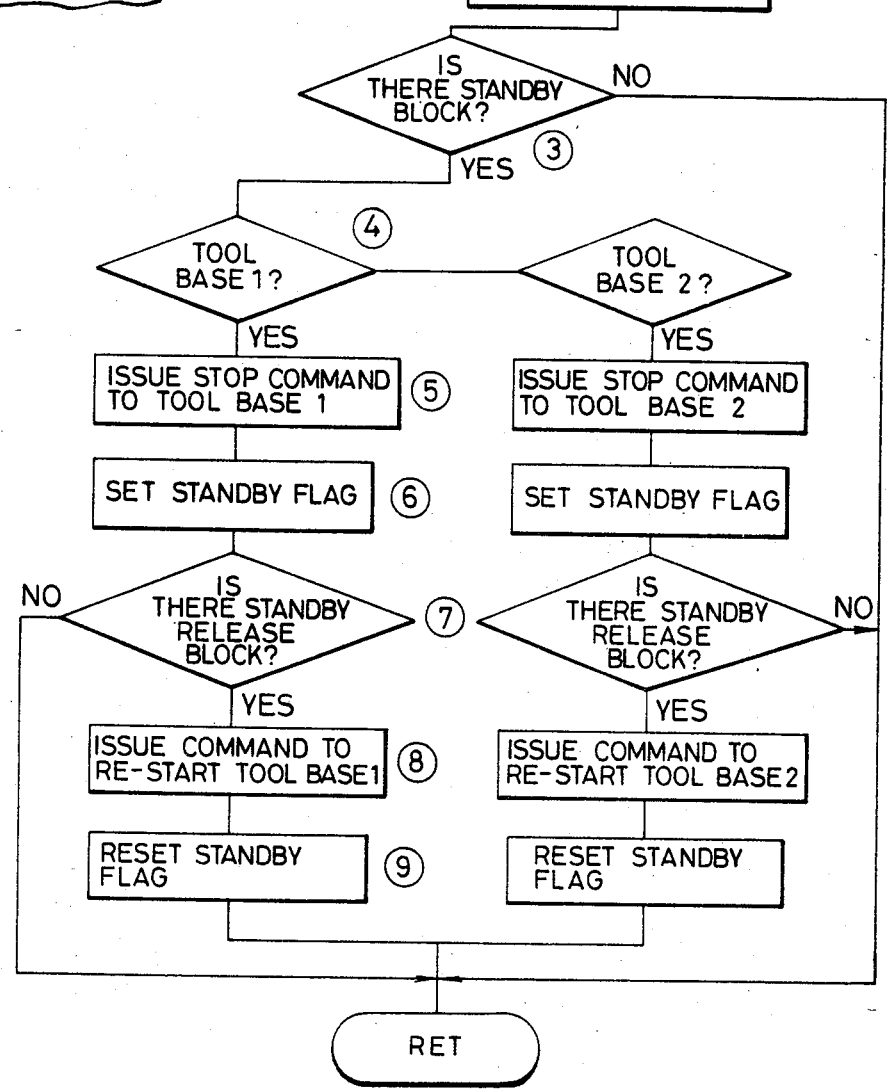
FIG. 7 is a flowchart of operations of a standby control unit.

FIG. 7 is a flowchart of a processing operation of the standby control unit 33, the processing operation having successive steps 1 through 9. FIGS. 8A through 8D are diagrams showing sequence operations of the tool bases.

Operation of the numerical control system according to the present invention will be described. For setting and storing standby data when both of the tool bases 14 and 15 in FIG. 3 are operating simultaneously, the standby command switch 29 for the first tool base 14 is turned on to enable the standby data setting unit 31 to carry out its processing operation according to the flowchart of FIG. 5. More specifically, when the standby command switch 29 is detected as being turned on at a step 1, the first tool base 14 is designated at a step 2. Then, the program goes to a step 3 to determine whether the first tool base 14 has already been in a standby mode. If not, then a stop command is issued to the machine control unit 25 for the tool base 14 at a step 4, and a standby flag is set at a step 5. Thereafter, the program number and the block number of the standby program for the first tool base 14 are stored at a step 6. Control then waits for a turn-off (standby release) of the standby command switch 29 at a step 7. If operation of the first tool base 14 is confirmed by the turn-off of the standby command switch 29 in the step 7, then the program number and the block number of the standby program for the second tool base 15 are stored at a step 8. The stop command for the first tool base 14 is removed to continue operation of the first tool base 14 at a step 9. The stored data shown in FIG. 6 is transferred as standby data to the standby data file 32 at a step 10, followed by the resetting of the standby flag to finish the processing operation of the standby data setting unit 31 at a step 11. Standby data is set and stored in the same manner as described above for the second tool base 15.

No new standby command is accepted during any standby operation. The foregoing operation is repeated during a machining cycle for successively storing standby data.

Operation of the standby control unit 33 will be described with reference to FIG. 7. Standby data is fetched from the standby data file 32 at a step 1. The program numbers and the block numbers of the machining programs being executed for the tool bases 14 and 15 are fetched from the machining program buffers 23 and 24 shown in FIG. 4 at a step 2, and are compared with the standby data fetched from the standby data file 32 at a step to detect a standy block at a step 3. If the standby block detected is the machining program for the first tool base 14 at a step 4, then a stop command is issued to the machine control unit 25 for the first tool base 14 at a step 5 to cause the first tool base 14 to enter a standby mode at the start of the detected machining program block. A standby flag is set to block a new standby command at a step 6.

Then, the standby data and the program number and the block number of the machining program for the companion tool base (second tool base 15) are compared to detect a standby release block at a step 7. The standby command for the first tool base 14 is removed to execute the succeeding machining program at a step 8. Then, the standby flag is reset at a step 9. One cycle of standby control is thus brought to an end. Standby control of the second tool base 5 can be performed in the same manner as described above. After one cycle of standby control is over, the next standby data may be fetched from the standby data file 32 to enter a new cycle of standby control so that the tool bases will be controlled successively according to the standby data set in one machining cycle.

Figures 8A, 8B, 8C, 8D:
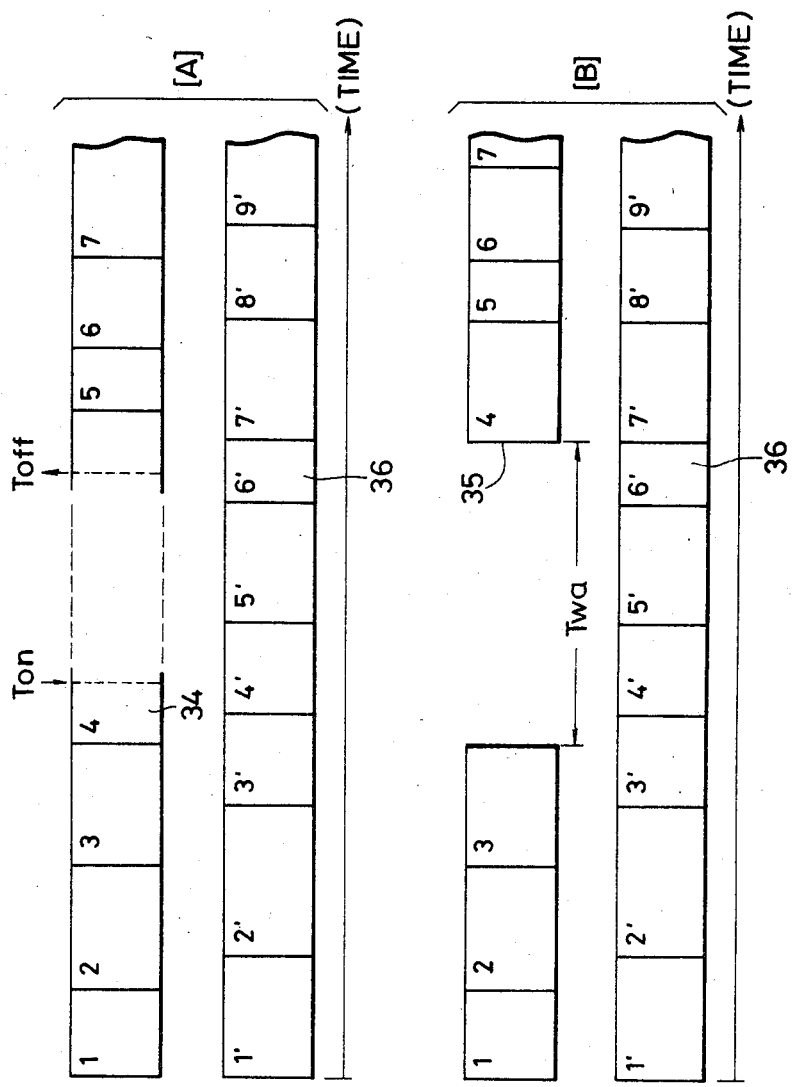
FIGS. 8A through 8D are diagrams showing sequential operations of tool bases in the four-axis lathe controlled by the NC system of the present invention.

FIGS. 8A and 8B illustrate sequence operations at the time of setting standby data, and FIGS. 8C and 8D sequence operations at the time of standby control. FIGS. 8A and 8C show operation sequences of the first tool base 14, and FIGS. 8B and 8D an operation sequences of the second tool base 15. Also, designated by $T_{on}$ is a standby on time, and by $T_{off}$ a standby off time. As shown in FIGS. 8A and 8B, standby data can be set or removed anywhere in a machining block as indicated by 34. In standby control, as illustrated in FIGS. 8C and 8D, one tool base can be controlled to enter a standby mode at the start of a block set for standby operation as indicated by 35, and released from the standby mode for effecting a succeeding machining operation from a block following a standby release block of the machining program for the other tool base.

While in the foregoing embodiment standby commands are entered by the standby control switches, they may be entered by an external standby detection device such as a device for checking intereference between the tool bases, instead of the standby control switches. Generation of standby commands may also be controlled by an interference checking function in the same numerical control system.

With the arrangement of the present invention, standby control data for machining with a lathe having a plurality of axes, e.g., four axes, can be stored simply by giving standby commands, through operator-controlled pushbutton switches, at desired times in the first run or graphics-based simulation of a new machining program. Accordingly, standby control can easily and reliably be performed in actual machining operation. The numerical control system of the present invention is therefore advantageous in that operations such as machining program editing can therefore be dispensed with, the time required for preparation of machining with a multi-axis lathe can greatly be reduced, and no skilled operator is needed.

Although a certain preferred embodiment has been shown and described, it should be understood that many changes and modifications may be made therein without departing from the scope of the appended claims.

I claim:

1. A numerical control unit for a lathe having a plurality of tool bases, comprising:
    (a) means for entering standby commands for temporarily stopping the tool bases while the tool bases are being simultaneously operated under respective machining programs;
    (b) a standby data setting unit for storing a program number and a block number of the machining program for a one of the tool bases stopped in movement by the standby command, and for releasing said one of the tool bases as stopped when said standby command is removed and storing as standby data the program number and the block number of the machining program for another tool base at the time;
    (c) a standby data file for successively storing standby data set by said standby data setting unit a plurality of times during an operation; and
    (d) a standby control unit for referring to standby data in said standby data file from a previous operation, detecting a standby block from the machining programs being executed for said tool bases, issuing a standby command to temporarily stop one of said tool bases, and detecting a standby release block from the machining program being executed for another tool base to remove the standby command.

2. A numerical control system according to claim 1, wherein said means for entering standby commands comprises external pushbutton switches.

3. A numerical control system according to claim 1, wherein said means for entering standby commands comprises means for checking interference between said tool bases.

4. A numerical control system according to claim 1, wherein said lathe is a four-axis lathe comprising two tool bases.

* * * * *